(12) United States Patent
Grunert

(10) Patent No.: US 10,343,625 B2
(45) Date of Patent: Jul. 9, 2019

(54) VEHICLE DOOR WITH DOOR TRIM PANEL

(71) Applicant: Dr. Ing. h.c. F. Porsche Aktiengesellschaft, Stuttgart (DE)

(72) Inventor: Daniel Grunert, Heimsheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 2 days.

(21) Appl. No.: 15/709,566

(22) Filed: Sep. 20, 2017

(65) Prior Publication Data

US 2018/0086287 A1 Mar. 29, 2018

(30) Foreign Application Priority Data

Sep. 29, 2016 (DE) .................. 10 2016 118 452

(51) Int. Cl.
| | | |
|---|---|---|
| *B62D 25/04* | (2006.01) | |
| *B60R 13/08* | (2006.01) | |
| *B60J 5/04* | (2006.01) | |
| *B60R 13/02* | (2006.01) | |

(52) U.S. Cl.
CPC ......... *B60R 13/0815* (2013.01); *B60J 5/0413* (2013.01); *B60J 5/0469* (2013.01); *B60R 13/0243* (2013.01); *B60Y 2306/09* (2013.01)

(58) Field of Classification Search
CPC ... B29C 66/71; B29C 66/7212; E06B 3/5892; E06B 3/72; E05D 5/02; E05Y 2900/132; H04N 19/61; B21C 37/16; B21K 21/12; B60N 2/072
USPC ...................................... 296/146.5
See application file for complete search history.

(56) References Cited

U.S. PATENT DOCUMENTS

| | | | | |
|---|---|---|---|---|
| 5,033,236 | A * | 7/1991 | Szerdahelyi | B60J 5/0416 280/730.2 |
| 5,482,344 | A * | 1/1996 | Walker | B60R 21/0428 280/751 |
| 5,531,499 | A * | 7/1996 | Vecchio | B60R 13/0206 188/377 |
| 6,893,077 | B1 * | 5/2005 | DeJongh | B60N 2/42709 296/187.05 |
| 8,955,901 | B2 * | 2/2015 | Yamada | B21D 19/08 296/146.9 |
| 9,994,165 | B1 * | 6/2018 | Barrera Torres | B60R 13/0243 |
| 2006/0001291 | A1 * | 1/2006 | Dooley | B60R 13/0206 296/153 |

(Continued)

FOREIGN PATENT DOCUMENTS

| | | |
|---|---|---|
| DE | 44 16 972 | 11/1995 |
| DE | 10 2006 029 112 | 1/2008 |
| DE | 10 2012 109 044 | 3/2014 |

OTHER PUBLICATIONS

German Search Report dated Jun. 7, 2017.

*Primary Examiner* — Kiran B Patel
(74) *Attorney, Agent, or Firm* — Gerald E. Hespos; Michael J. Porco; Matthew T. Hespos

(57) ABSTRACT

A vehicle door (1) has a door frame (2) and a door trim panel (3) connected to the door frame (2). The door trim panel (3) accommodates flexible spacers (4) that make contact with planar portions of the door frame (2). Each spacer (4) has a ribbed structure (11) in the region of contact with the door frame (2). The vehicle door (1) ensures satisfactory contact between the attached door trim panel (3) and the door frame (2), even when there are frame tolerances.

11 Claims, 2 Drawing Sheets

(56) References Cited

U.S. PATENT DOCUMENTS

| | | | |
|---|---|---|---|
| 2006/0220274 A1* | 10/2006 | Dooley | B29C 45/14196 264/259 |
| 2006/0265961 A1 | 11/2006 | Winborn et al. | |
| 2007/0056219 A1* | 3/2007 | Martinez Morai | B60J 5/0416 49/502 |
| 2007/0107315 A1* | 5/2007 | Koellner | B60J 5/0416 49/502 |
| 2007/0138833 A1* | 6/2007 | Cowelchuk | B60R 21/04 296/187.05 |
| 2009/0134660 A1* | 5/2009 | Pinkerton | B60N 2/4235 296/146.7 |
| 2009/0230723 A1* | 9/2009 | Huang | B60J 10/80 296/146.9 |
| 2009/0313903 A1 | 12/2009 | Mieglitz et al. | |
| 2011/0042987 A1* | 2/2011 | Parkinson | B29C 65/08 296/1.08 |
| 2011/0099912 A1* | 5/2011 | Ohtake | B60J 5/0402 49/502 |
| 2013/0205546 A1* | 8/2013 | Vemulapati | B60R 13/0206 24/289 |
| 2014/0117704 A1* | 5/2014 | Ide | B60J 5/0402 296/146.2 |
| 2015/0108785 A1* | 4/2015 | Yokota | B60J 5/0408 296/146.5 |
| 2015/0165943 A1* | 6/2015 | Doan | B60R 13/0243 297/411.21 |
| 2015/0251527 A1* | 9/2015 | Moreton-Smith | B60J 5/0402 296/146.7 |
| 2015/0283926 A1* | 10/2015 | Hamdoon | B60N 2/4235 297/411.21 |
| 2015/0291069 A1* | 10/2015 | Jayasuriya | B60R 13/0243 296/153 |
| 2018/0056892 A1* | 3/2018 | Patel | B60R 13/0206 |
| 2018/0170161 A1* | 6/2018 | Makita | F16B 5/121 |

* cited by examiner

VEHICLE DOOR WITH DOOR TRIM PANEL

CROSS REFERENCE TO RELATED APPLICATION

This application claims priority under 35 USC 119 to German Patent Appl. No. 10 2016 118 452.7 filed on Sep. 29, 2016, the entire disclosure of which is incorporated herein by reference.

BACKGROUND

Field of the Invention

The invention relates to a vehicle door that has a door frame and a door trim panel connected to the door frame. The door trim panel accommodates flexible spacers, and each spacer makes contact with a planar portion of the door frame.

Description of the Related Art

Vehicle doors with door frames, door trim panels and spacers are used on prior art motor cars and are configured so that the trim panel covers the door frame with respect to the vehicle interior. For example, DE 10 2012 109 044 A1 discloses such an arrangement where the spacer makes contact with a planar portion of the door frame. More particularly, the spacer rests loosely on the door frame and hence is not connected thereto in a fixed manner. The side of the spacer facing the door frame has an outward-curved surface that curves in two planes arranged perpendicular to one another. Thus, the respective spacer makes contact with the door frame by substantially point contact.

DE 10 2006 029 112 A1 discloses acoustic absorbers or other compensating or sealing elements in a sealing region between a door frame and a door trim panel. The sealing elements have sealing profiles with sealing lips to improve the sealing effect.

US 2006/0265961 A1 discloses sealing elements with a rib structure between a door trim panel and a door frame.

Frame tolerances of the door frame on motor vehicles can cause the door trim panel to generate noise while driving.

It is the object of the invention to provide a vehicle door where contact between the spacer and the door frame is ensured, even when there are frame tolerances.

SUMMARY

The invention relates to a vehicle door with a spacer that has a rib-shaped structure in the region of contact of the spacer with the door frame. Thus, the respective spacer rests on the door frame via ribs, and the ribs can compensate for frame tolerances of the door frame. The spacers also are configured to prevent the door trim panel from generating noise while driving.

The rib shapes make the spacers particularly well-suited as compensating elements for possible frame tolerances in the region of the door trim panel.

The ribs may be parallel to one another and may have free ends that contact the door frame.

The spacers may have identically configured ribs. In particular, each spacer may have ribs of equal length in relation to a normal and/or a line parallel to the region of contact of the door frame. These different configurations ensure particularly precise contact of the respective ribs with the door frame.

An envelope of the ribs of the respective spacer may be a rectangle. The ribs of the respective spacer are thus effective in a region of relatively compact configuration and rest loosely against the door frame there.

Each spacer may have three to seven, preferably four to six, in particular five, ribs. Thus, precise contact between the spacer and the door trim panel combined with optimum compensation of manufacturing tolerances of the door trim panel is possible.

Each rib may have an outward-oriented curve, particularly in the region of the side or end thereof facing the door frame. Thus, the curved region of the rib rests against the door frame.

Each spacer can be of flexible design overall. However, it is quite conceivable to make only the ribs of the spacer flexible.

The door trim panel may have mounts, and the spacers may be connected respectively to the mounts. This results in particularly simple assembly and reliable fastening. This connection produced by mounting may be a positive connection.

Further features of the invention will become apparent from the attached drawings and the description of the embodiment shown in the drawing, without being restricted thereto.

DETAILED DESCRIPTION

Figure 1:
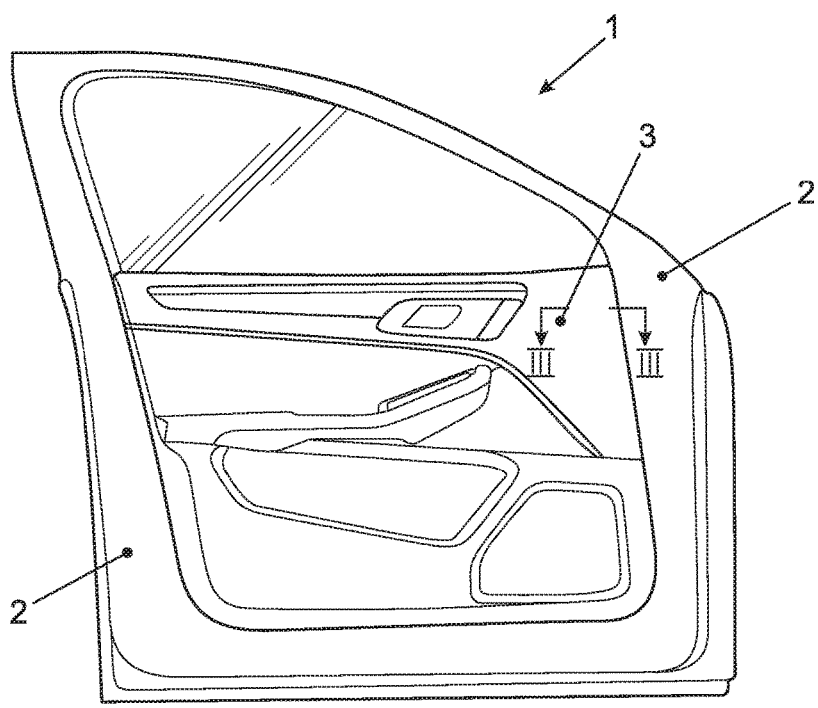
FIG. 1 shows a view of a vehicle door with a door frame and a door trim panel connected thereto.

FIG. 1 shows a front vehicle door 1 from the inside with a door frame 2 and a door trim panel 3 connected thereto. The door trim panel 3 is connected to the door frame 2 by plug connectors as connecting elements (not shown). Flexible spacers 4 are positioned between the door trim panel 3 and the door frame 2 to ensure a defined spacing between the door trim panel 3 and the door frame 2 in regions in which the door trim panel 3 does not rest directly on the door frame 2. The spacers 4 also compensate for possible frame tolerances of the door frame 2 in the region of the door trim panel 3.

Figure 2:
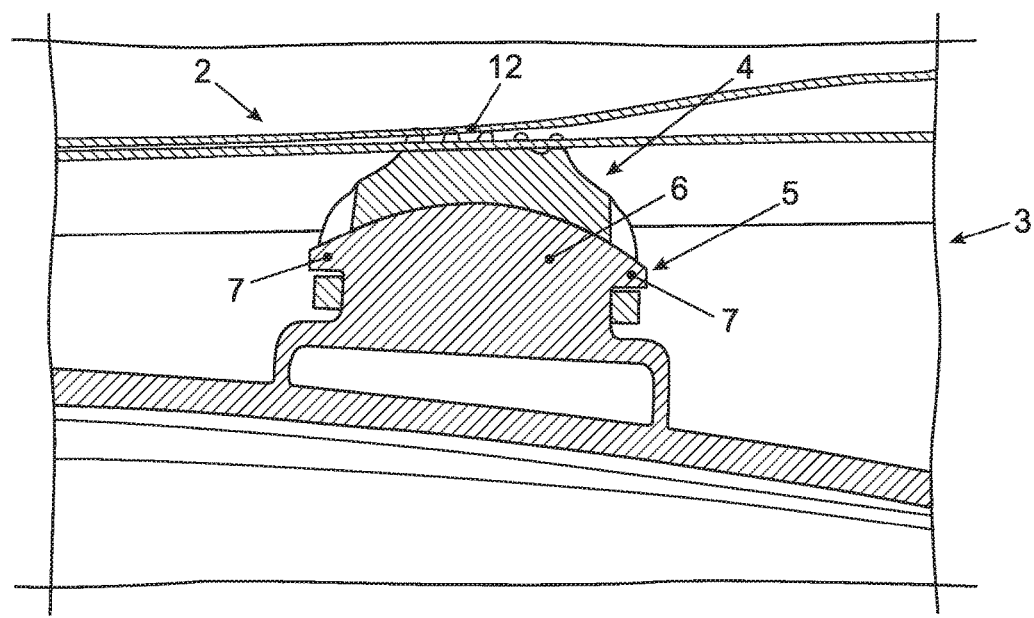
FIG. 2 shows a section through the vehicle door in the region of one of various spacers used therewith, sectioned perpendicularly to the planar portion of the door frame in the region of contact of the spacer.
Figure 3:
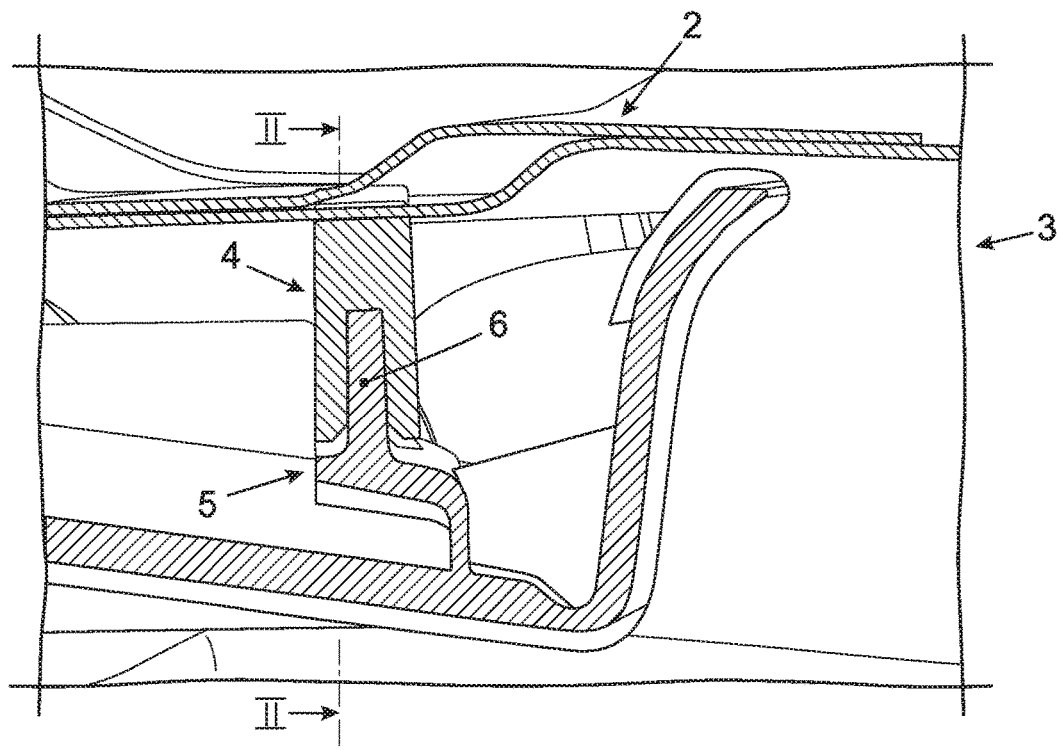
FIG. 3 shows the arrangement in accordance with FIG. 2 in a section perpendicular to the planar portion of the door frame and perpendicular to the section plane of FIG. 2.
Figure 4:
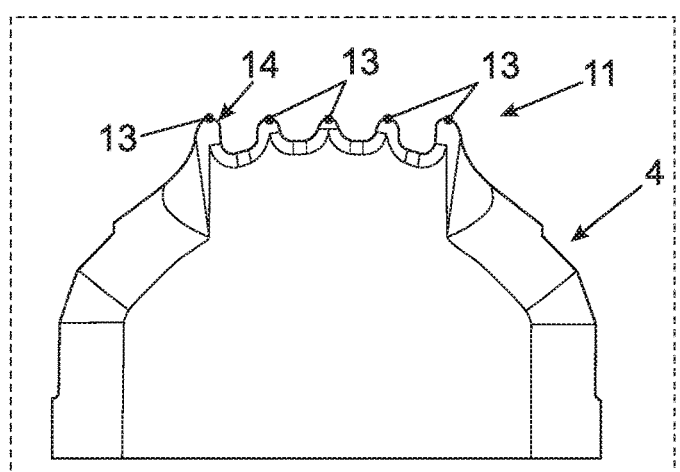
FIG. 4 is a side view of a spacer.
Figure 5:
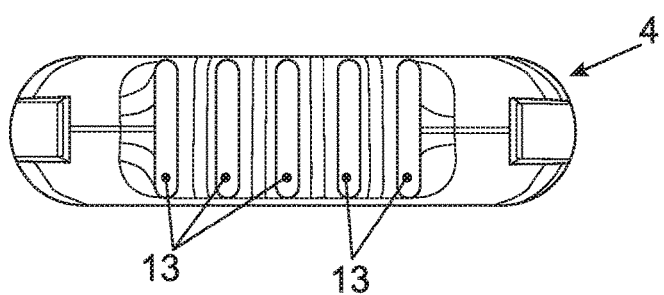
FIG. 5 is a plan view of the spacer of FIG. 4.

The interaction of the spacers 4 accommodated by the door trim panel 3 is illustrated by way of example for one spacer 4 in FIGS. 2 and 3, and this spacer 4 is shown as an isolated component in FIGS. 4 and 5.

The door trim panel 3 has mounts 5 in the region of the respective spacer 4. Each mount 5 has a plate-shaped receiving portion 6 and diametrically arranged projecting shoulders 7 connected thereto. The respective shoulder 7 tapers toward its end remote from the other shoulder 7. Thus, the respective mount 5 is hat-shaped is cross-section.

The spacer 4 is a relatively flat flexible body of relatively flat configuration with a largely semicircular shape when seen in a side view.

The spacer 4 has a flat end face 8 and a cavity 9 for the matched insertion of the plate-shaped receiving portion 6. This cavity 9 opens into two diametrically arranged passages 10 through the spacer 4, through which the shoulders 7 pass when the spacer 4 is mounted on the mount 5. Thus, the spacer 4 is connected securely to the mount 5.

A ribbed structure 11 is provided on the side of the spacer 4 facing away from the mount 5 and in the region of contact between the spacer 4 and the door frame 2. The ribbed structure 11 makes contact with a planar portion of the door frame 2, in the present case a door panel 12. The flexible structure of the spacer 4 overall enables the spacer 4 to deform elastically when in contact with the door panel 12 or the door frame 2, depending on what forces are acting between the spacer 4 and the door frame 2. This deformation is particularly precise owing to the design of the ribbed structure 11, corresponding to the forces acting on the individual ribs 13 of the ribbed structure 11.

As shown in FIGS. 4 and 5, the respective spacer 4 has ribs 13 arranged parallel to one another. The ribs 13 are of identical configuration and five ribs 13 are provided per spacer 4. In the region of the end facing the door frame 2, more specifically the door panel 12, each rib 13 has an outward-oriented curve 14. In the direction of view of the illustration according to FIG. 5, an envelope of the ribs 13 has the shape of a rectangle. Thus, the ribs 13 are of equal-length.

The free ends of the ribs 13 make contact between the spacer 4 and the door frame 2. If the door frame 2 or door panel 12 is parallel to the free ends of the ribs 13, contact is made with all the ribs 13 and there is a certain deformation of the ribs 13 in the contact region. If, in contrast, the door panel 12 is not arranged parallel to the free ends of the ribs 13, only individual ribs 13 are deformed, while others generally remain out of contact with the door panel 12. If there is a tolerance deviation in the door frame 2 in the case of a different vehicle door, there is modified contact between the spacer 4 and the door frame 2, with either more or fewer ribs 13 of the respective spacer 4 being deformed by the door frame 2 in contact.

What is claimed is:

1. A vehicle door, comprising:
   a door frame;
   a door trim panel mounted to the door frame; and
   at least one flexible spacer provided on the door trim panel, the at least one spacer making contact with a planar portion of the door frame, and the at least one spacer having a ribbed structure in contact with the door frame.

2. The vehicle door of claim 1, wherein the ribbed structure of the at least one spacer has ribs arranged parallel to one another.

3. The vehicle door of claim 2, wherein the ribs of the at least one spacer have free ends that contact the door frame.

4. The vehicle door of claim 2, wherein each of the at least one spacer has identically configured ribs.

5. The vehicle door of claim 2, wherein the ribs of the at least one spacer are of equal length to each other.

6. The vehicle door of claim 2, wherein an envelope of the ribs of the at least one spacer is a rectangle.

7. The vehicle door of claim 2, wherein the rib-shaped structure of the at least one spacer has five ribs.

8. The vehicle door of claim 2, wherein ends of the ribs have an outward-oriented curve facing the door frame.

9. The vehicle door of claim 2, wherein the at least one spacer is flexible.

10. The vehicle door of claim 1, wherein the door trim panel has at least one mount, and the at least one spacer is connected to the at least one mount.

11. The vehicle door of claim 10, wherein the at least one spacer is connected positively to the at least one mount.

* * * * *